United States Patent
Nonomura et al.

[19]

[11] Patent Number: 6,046,778

[45] Date of Patent: Apr. 4, 2000

[54] APPARATUS FOR GENERATING SUB-PICTURE UNITS FOR SUBTITLES AND STORAGE MEDIUM STORING SUB-PICTURE UNIT GENERATION PROGRAM

[75] Inventors: Tomoyuki Nonomura; Mitsuhiro Inoue, both of Osaka; Yasushi Uesaka, Sanda; Masayuki Kozuka, Neyagawa, all of Japan

[73] Assignee: Matsushita Electric Industrial Co., Ltd., Osaka, Japan

[21] Appl. No.: 09/181,408

[22] Filed: Oct. 28, 1998

[30] Foreign Application Priority Data

Oct. 29, 1997 [JP] Japan ..................................... 9-296756

[51] Int. Cl.[7] ........................... H04N 5/445; H04N 5/278
[52] U.S. Cl. .......................... 348/565; 348/564; 348/569; 348/589
[58] Field of Search ..................... 348/563, 564, 348/565, 569, 589, 600; H04N 5/278, 5/50, 5/445, 5/45

[56] References Cited

U.S. PATENT DOCUMENTS 5,561,471  10/1996  Kim et al. ............................... 348/565

FOREIGN PATENT DOCUMENTS 5292401  11/1993  Japan .
6233208   8/1994  Japan .

Primary Examiner—Sherrie Hsia
Attorney, Agent, or Firm—Price, Gess & Ubell

[57] ABSTRACT

To provide a sub-picture unit generation apparatus for generating a plurality of sub-picture units that compose a sub-picture stream which is interleaved with a video stream into a system stream, each sub-picture unit including a subtitle image that is to be superimposed on moving images reproduced from the video stream. The sub-picture unit generation apparatus includes an attribute storage unit for storing a display attribute that shows a base position for arranging each subtitle image, a character string storage unit for storing a plurality of subtitle character strings, a subtitle image generation unit for generating a subtitle image from one of the plurality of subtitle character strings stored in the character string storage unit, a display position determination unit for determining a display position of the subtitle image according to the display attribute, and a sub-picture unit generation unit for generating a sub-picture unit that includes the subtitle image and display position data showing the determined display position.

20 Claims, 12 Drawing Sheets

FIG. 2

| SUBTITLE NUMBER | SUBTITLE CHARACTER STRING |
|---|---|
| 1 | こんにちは¥n<br>いいおてんきですね |
| 2 | いいおてんきね |
| 3 | 山へ行かない |
| 4 | いいわね |
| ⋮ | ⋮ |

FIG. 3

| SUBTITLE NUMBER | SUBTITLE DISPLAY START TIME | SUBTITLE DISPLAY STOP TIME |
|---|---|---|
| 1 | 00 : 00 : 00 : 00 : 00 | 00 : 00 : 00 : 05 : 00 |
| 2 | 00 : 00 : 00 : 05 : 00 | 00 : 00 : 00 : 10 : 00 |
| 3 | 00 : 00 : 00 : 10 : 00 | 00 : 00 : 00 : 15 : 00 |
| 4 | 00 : 00 : 00 : 15 : 00 | 00 : 00 : 00 : 20 : 00 |
| ⋮ | ⋮ | ⋮ |

FIG. 4A

| DISPLAY POSITION (Y COORDINATE) | 380 |
|---|---|
| ALIGNMENT | TOP |

FIG. 4B

| DISPLAY POSITION (Y COORDINATE) | 420 |
|---|---|
| ALIGNMENT | BOTTOM |

| 0 | 0 | 0 | 0 | 0 | 0 |
|---|---|---|---|---|---|
| 0 | 0 | 0 | 0 | 0 | 0 |
| 1 | 1 | 1 | 1 | 0 | 0 |
| 0 | 0 | 1 | 1 | 0 | 0 |
| 0 | 0 | 1 | 1 | 0 | 0 |
| 0 | 0 | 1 | 1 | 0 | 0 |

| 0 | 0 | 0 | 0 | 0 | 0 |
|---|---|---|---|---|---|
| 0 | 0 | 2 | 2 | 0 | 0 |
| 4 | 4 | 4 | 4 | 2 | 0 |
| 0 | 0 | 4 | 4 | 2 | 0 |
| 0 | 0 | 4 | 4 | 0 | 0 |
| 0 | 0 | 4 | 4 | 0 | 0 |

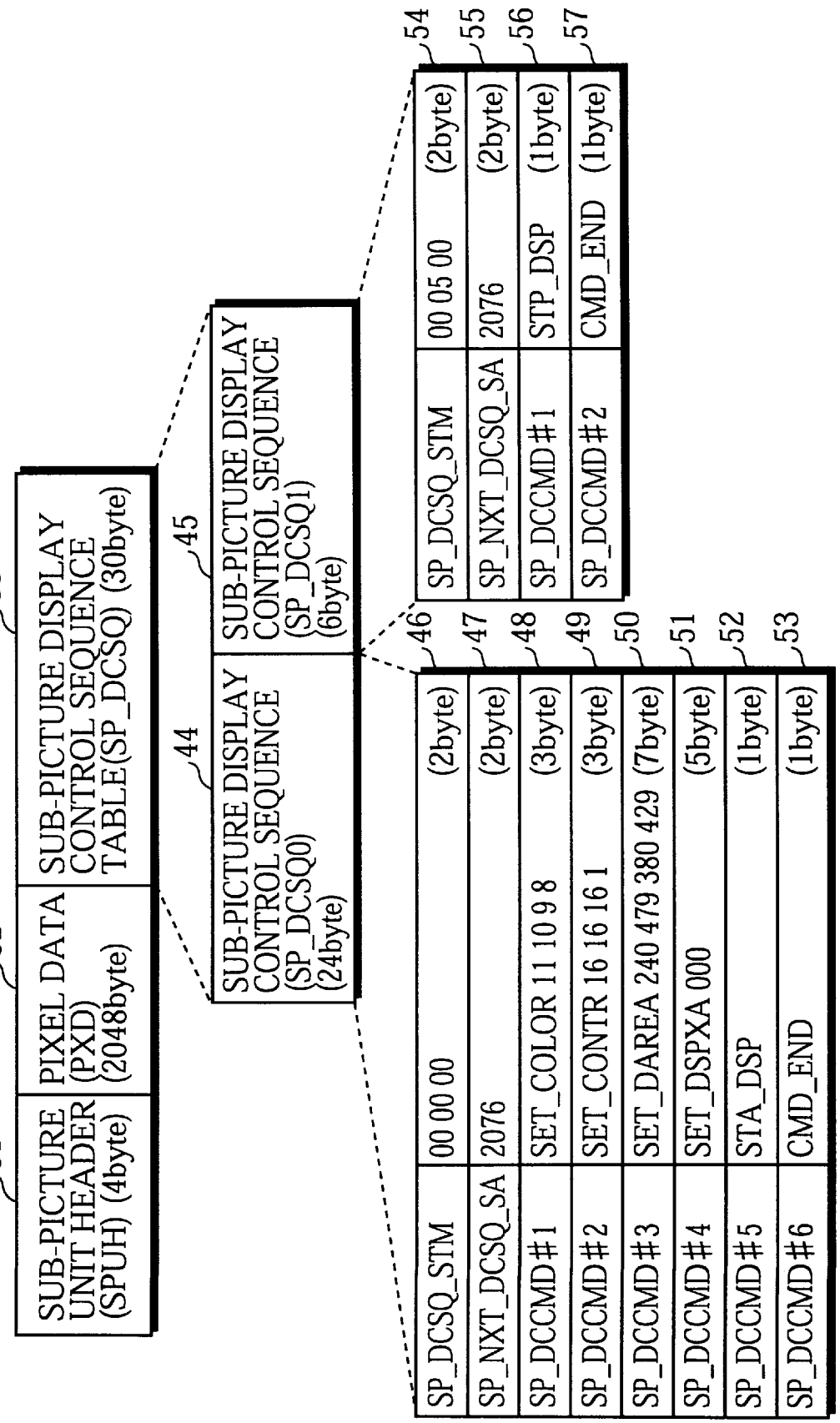

FIG. 11

| SUBTITLE NUMBER | DISPLAY ATTRIBUTE INDICATION | SUBTITLE CHARACTER STRING |
|---|---|---|
| 1 | FIRST HORIZONTAL ATTRIBUTE | こんにちは¥n<br>いいおてんきですね |
| 2 | SECOND VERTICAL ATTRIBUTE | いいおてんきね |
| 3 | FIRST HORIZONTAL ATTRIBUTE | 山へ行かない |
| 4 | FIRST VERTICAL ATTRIBUTE | いいですね |
| ⋮ | ⋮ | ⋮ |

FIG. 12

FIRST HORIZONTAL ATTRIBUTE

| DISPLAY POSITION (Y COORDINATE) | 380 |
|---|---|
| ALIGNMENT | TOP |

SECOND HORIZONTAL ATTRIBUTE

| DISPLAY POSITION (Y COORDINATE) | 420 |
|---|---|
| ALIGNMENT | BOTTOM |

FIRST VERTICAL ATTRIBUTE

| VERTICAL SUBTITLE DISPLAY POSITION (Y COORDINATE) | 120 |
|---|---|
| VERTICAL LEFT SUBTITLE DISPLAY POSITION (X COORDINATE) | 70 |

SECOND VERTICAL ATTRIBUTE

| VERTICAL SUBTITLE DISPLAY POSITION (Y COORDINATE) | 120 |
|---|---|
| VERTICAL RIGHT SUBTITLE DISPLAY POSITION (X COORDINATE) | 650 |

APPARATUS FOR GENERATING SUB-PICTURE UNITS FOR SUBTITLES AND STORAGE MEDIUM STORING SUB-PICTURE UNIT GENERATION PROGRAM

This application is based on an application No. 9-296756 filed in Japan, the content of which is hereby incorporated by reference.

BACKGROUND OF THE INVENTION

1. Field of the Invention

The present invention relates to an apparatus for generating subtitle sub-picture units that compose a sub-picture stream which is interleaved with a video stream into a system stream, and especially relates to a sub-picture unit generation apparatus for subtitles that are superimposed on moving images reproduced from a video stream.

2. Description of the Background Art

In recent years, DVDs (Digital Versatile Discs) have increasingly been used as high-capacity record mediums.

A DVD records data called a system stream which is created using MPEG2 (Moving Picture Experts Group 2) video-compression techniques. A video stream, an audio stream, and a sub-picture stream are interleaved into the system stream.

The sub-picture stream includes still images which are superimposed on moving images reproduced from the video stream. When the video stream relates to a movie film, the sub-picture stream is composed of sub-picture units that correspond to subtitles used in the movie film. Each sub-picture unit includes a still image showing a subtitle, a subtitle display position, and a subtitle display start and stop time.

Conventional sub-picture units generated according to DVD authoring systems are disclosed in Japanese Laid-Open Patent Application No. 7-288776 "Sub-Picture Processing System and Storage Medium".

In this sub-picture processing system, each subtitle character string is read from a text file and rasterized in monochrome to obtain a monochrome bitmap, which is used to create a subtitle image. This subtitle image is then combined with data showing a subtitle image display position and a subtitle image display start and stop time to form a sub-picture unit.

In this processing, a display position of each subtitle image is determined by the user specifying the X and Y coordinates of the top left of a subtitle image on a display screen.

Thus, in conventional systems of generating sub-picture units for subtitles, it is necessary for the user to specify a display position of each subtitle on the screen. When a huge number of subtitles are present, such as in a movie film, it takes a considerable time to specify each subtitle display position. Also, subtitles for a movie film are usually centered on the lower part of the screen, and the coordinates of the top left point of a subtitle image display area need to be specified to determine a display position of the subtitle image. Since the size of subtitle images differs depending on the number of characters included in a subtitle, the user has to specify the X and Y coordinates of the top left point of each subtitle image on the display screen according to the width and height of a subtitle image.

SUMMARY OF THE INVENTION

The present invention aims to provide a sub-picture unit generation apparatus and a storage medium storing a sub-picture unit generation program with which the user does not have to specify a display position of each subtitle image which differs in size, and with which the time for generating sub-picture units for subtitles can be greatly reduced.

In order to fulfill the above object, the sub-picture unit generation apparatus of the present invention is a sub-picture unit generation apparatus for generating a plurality of sub-picture units that compose a sub-picture stream which is interleaved with a video stream into a system stream, each sub-picture unit including a subtitle image that is to be superimposed on moving images reproduced from the video stream, the sub-picture unit generation apparatus including: an attribute storage unit for storing a display attribute that shows a base position for arranging each subtitle image; a character string storage unit for storing a plurality of subtitle character strings; a subtitle image generation unit for generating a subtitle image from one of the plurality of subtitle character strings stored in the character string storage unit; a display position determination unit for determining a display position of the subtitle image according to the display attribute; and a sub-picture unit generation unit for generating a sub-picture unit that includes the subtitle image and display position data showing the determined display position.

Here, the subtitle image generated by the subtitle image generation unit may be rectangular, wherein the display attribute shows a position at which one of a top end, a bottom end, a left end, and a right end of each subtitle image is to be aligned.

Here, the subtitle image generation unit may generate the rectangular subtitle image in which one of the plurality of subtitle character strings is horizontally written, wherein the attribute storage unit stores one of a first horizontal attribute and a second horizontal attribute as the display attribute, the first horizontal attribute showing a position at which the top end of each subtitle image is to be aligned and indicating centering of each subtitle image, the second horizontal attribute showing a position at which the bottom end of each subtitle image is to be aligned and indicating centering of each subtitle image, and wherein the display position determination unit calculates coordinates (X_tl, Y_tl) at which a top left point of the subtitle image is to be placed, according to the display attribute, a height and a width of the subtitle image expressed in pixels, and a height and a width of a display screen expressed in pixels.

With the above construction, the display position of the subtitle image is determined according to the display attribute showing the position at which one of the top end, bottom end, left end, and right end of each subtitle image is to be aligned, so that the user does not need to determine the display position of each subtitle image that differs in size due to differences in the length of the character string. Accordingly, the time for generating sub-picture units for subtitles can be greatly reduced.

Here, the subtitle image generation unit may generate the rectangular subtitle image in which one of the plurality of subtitle character strings is vertically written, wherein the attribute storage unit stores one of a first vertical attribute and a second vertical attribute as the display attribute, the first vertical attribute showing a position at which the top end of each subtitle image is to be aligned and a position at which the left end of each subtitle image is to be aligned, the second vertical attribute showing a position at which the top end of each subtitle image is to be aligned and a position at which the right end of each subtitle image is to be aligned, and wherein the display position determination unit calculates coordinates (X_tl, Y_tl) at which a top left point of the subtitle image is to be placed, according to the display attribute, a height and a width of the subtitle image expressed in pixels, and a height and a width of a display screen expressed in pixels.

With the above construction, the display position of the subtitle image with the vertically-written character string on the left or right side of the screen is determined according to the display attribute, so that the above stated effect can be achieved.

Also, since the first vertical attribute specifies the position at which the left end of a vertically-arranged subtitle image is to be aligned, the subtitle image can be displayed on the left side of the screen without extending off the safe frame. In the same way, since the second vertical attribute specifies the position at which the right end of a vertically-written subtitle image is to be aligned, the subtitle image can be displayed on the right side of the screen without extending off the safe frame.

Here, the subtitle image generation unit may include: an outline font storage unit for storing outline fonts; a read unit for reading one of the plurality of subtitle character strings from the character string storage unit; and a rasterization unit for performing gray-scale rasterization based on outline fonts corresponding to the read-subtitle character string to generate the subtitle image.

With the above construction, the gray-scale rasterization is performed on the subtitle character string to generate the subtitle image. Accordingly, flicker caused by profound changes of brightness in edges of a character can be reduced. As a result, even when subtitles are written in language that has complex characters, such as Japanese or Chinese kanji characters, the shape of the characters can be accurately displayed.

The above object can also be fulfilled by a sub-picture unit generation apparatus for generating a plurality of sub-picture units that compose a sub-picture stream which is interleaved with a video stream into a system stream, each sub-picture unit including a subtitle image that is to be superimposed on moving images reproduced from the video stream, the sub-picture unit generation apparatus including: an attribute storage unit for storing at least two out of a first horizontal attribute, a second horizontal attribute, a first vertical attribute, and a second vertical attribute that each show a base position for arranging a subtitle image, the first horizontal attribute showing a position at which a top end of a subtitle image is to be aligned and indicating centering of the subtitle image, the second horizontal attribute showing a position at which a bottom end of a subtitle image is to be aligned and indicating centering of the subtitle image, the first vertical attribute showing a position at which a left end of a subtitle image is to be aligned and a position at which a top end of the subtitle image is to be aligned, and the second vertical attribute showing a position at which a right end of a subtitle image is to be aligned and a position at which a top end of the subtitle image is to be aligned; a text storage unit for storing a text that includes a plurality of subtitle character strings which are each accompanied with a display attribute indication; a subtitle image generation unit for generating a subtitle image from one of the plurality of subtitle character strings stored in the text storage unit; a display position determination unit for determining a display position of the subtitle image according to a display attribute corresponding to a display attribute indication for the subtitle character string; and a sub-picture unit generation unit for generating a sub-picture unit that includes the subtitle image and display position data showing the determined display position.

With the above construction, each subtitle image is associated with one of the plurality of display attributes. Accordingly, it is possible for the user to change the subtitle display position for different scenes or for different speakers. Here, the user indicates a display attribute for each subtitle image but not a display position (coordinates) of each subtitle image, so that the time for generating sub-picture units can be greatly reduced.

The above object can also be fulfilled by a computer-readable storage medium storing a sub-picture unit generation program for generating a plurality of sub-picture units that compose a sub-picture stream which is interleaved with a video stream into a system stream, each sub-picture unit including a subtitle image that is to be superimposed on moving images reproduced from the video stream, the sub-picture unit generation program including: a subtitle image generation step for reading each of a plurality of subtitle character strings from a character string file and generating a subtitle image from a read subtitle character string; a display position determination step for reading a display attribute showing a base position for arranging each subtitle image from an attribute file, and for determining a display position of the generated subtitle image according to the read display attribute; and a sub-picture unit generation step for generating a sub-picture unit that includes the subtitle image and display position data showing the determined display position.

With the above construction, the display position of the subtitle image is determined according to the display attribute showing the position at which one of the top end, bottom end, left end, and right end of each subtitle image is to be aligned, so that the user does not need to determine the display position of each subtitle image that differs in size due to differences in the length of the character string. Accordingly, the time for generating sub-picture units for subtitles can be greatly reduced.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 2 shows examples of subtitle character strings in the text file 8;

FIG. 3 shows an example of the time code file 9;

FIG. 4A shows an example of a display attribute (first horizontal attribute);

FIG. 4B shows an example of a display attribute (second horizontal attribute);

FIG. 9 shows the specific data structure of a sub-picture unit;

FIG. 11 shows examples of subtitle character strings in the text file 28;

FIG. 12 shows the display attribute file 31 which includes a plurality of display attributes;

DESCRIPTION OF THE PREFERRED EMBODIMENT(S)

First Embodiment

Construction

Figure 1:
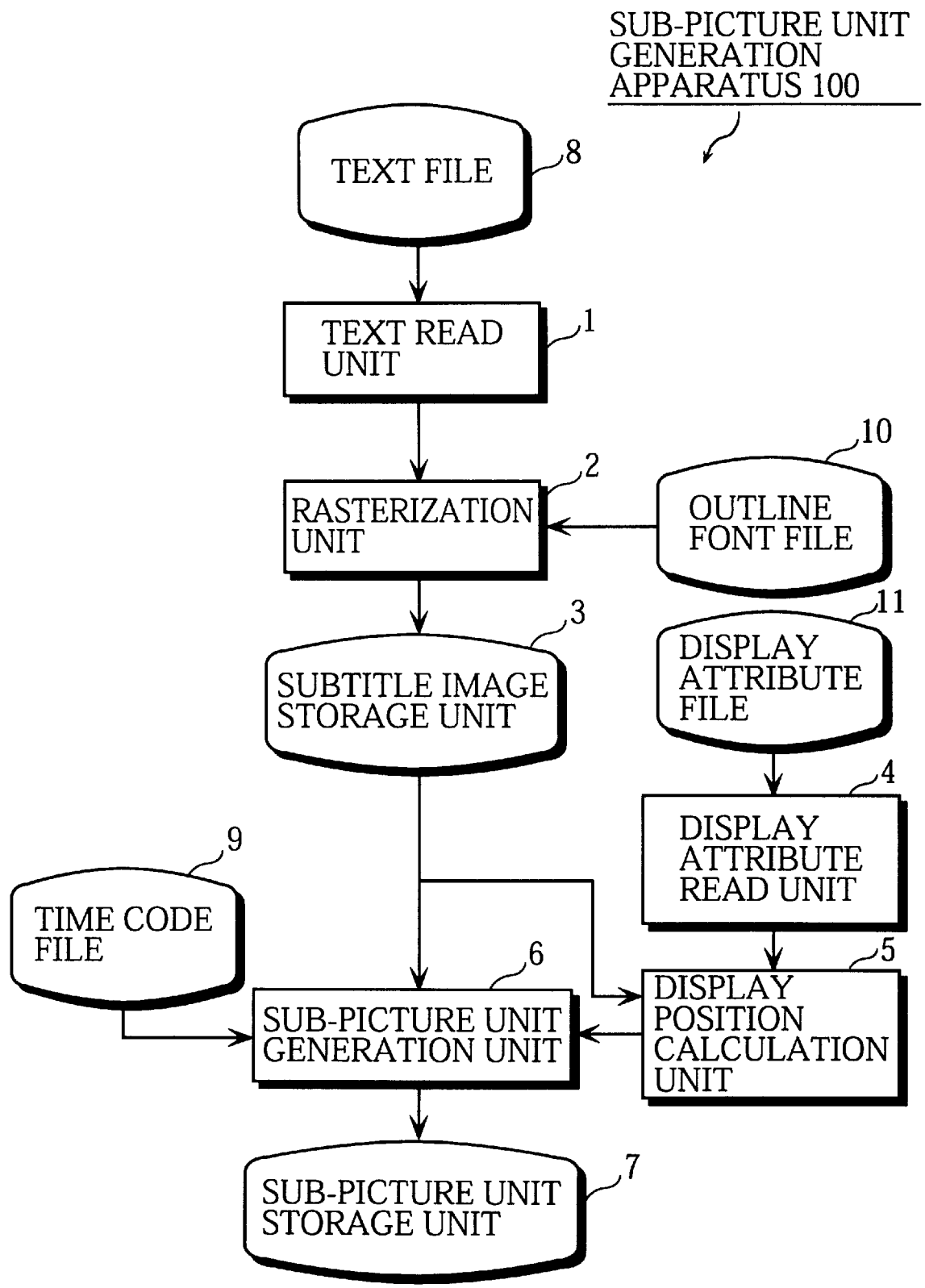
FIG. 1 is a function block diagram showing the sub-picture unit generation apparatus of the first embodiment of the present invention.

FIG. 1 is a function block diagram showing the sub-picture unit generation apparatus of the first embodiment of the present invention. Functions of the components shown in this block diagram are realized by executing sub-picture unit generation software in a general-purpose computer, such as a work station, which is equipped with a CPU, a memory, an HDD, and a display.

In FIG. 1, the sub-picture unit generation apparatus 100 includes a text read unit 1, a rasterization unit 2, a subtitle image storage unit 3, a display attribute read unit 4, a display position calculation unit 5, a sub-picture unit generation unit 6, and a sub-picture unit storage unit 7, and generates sub-picture units using a text file 8, a time code file 9, an outline font file 10, and a display attribute file 11 which are stored in the HDD.

A sub-picture unit includes a still image showing a subtitle (hereinafter, subtitle image) which will be superimposed on moving images reproduced from a video stream, and data showing a display position and a display start and stop time for the subtitle image. A sub-picture stream composed of a plurality of sub-picture units is interleaved with a video stream and an audio stream into a system stream, which is then recorded on a record medium, such as a DVD.

In FIG. 1, the text file 8, the time code file 9, and the outline font file 10 are used for generating sub-picture units, while the display attribute file 11 is used for calculating a display position of each subtitle image. These files are explained below.

The text file 8 includes a plurality of character strings that each correspond to a subtitle. Each subtitle character string is given a subtitle number in the text file 8, as shown in FIG. 2.

The time code file 9 includes a subtitle display start time and a subtitle display stop time for each subtitle number, as shown in FIG. 3. In the figure, the subtitle display start time and the subtitle display stop time are expressed as "(hour):(minute):(second):(frame number)". Here,, "frame number" shows the number of one of the frames, such as frame numbers 1 to 30, that compose moving images of one second.

The outline font file 10 includes outline fonts (vector fonts) in which an outline of each character is shown by vector information.

The display attribute file 11 includes a display attribute that shows a base position used when arranging each subtitle image. This display attribute shows a position at which one of the top end, bottom end, right end, and left end of the subtitle image (rectangle) is to be aligned, and is specified by the user.

FIG. 4A shows an example of such a display attribute. In the figure, the display position (Y coordinate) is set at "380", and the top alignment is specified. Here, the top alignment means that a horizontally-written subtitle image is centered and the top end of the subtitle image (rectangle) is aligned at the set display position (Y coordinate).

Another display attribute example is shown in FIG. 4B. Here, it is specified that a horizontally-written subtitle image is centered and the bottom end of the subtitle image (rectangle) is aligned at the Y coordinate "420".

The following is an explanation of the components shown in FIG. 1.

The text read unit 1 reads each subtitle number and subtitle character string from the text file 8.

The rasterization unit 2 creates a subtitle image from a subtitle character string read by the text read unit 1 and outputs the created subtitle image to the subtitle image storage unit 3 along with the size (width and height of the subtitle image expressed in pixels) of the subtitle image. More specifically, the rasterization unit 2 rasterizes the subtitle character string using outline fonts, and compresses the obtained bitmapped image according to run-length encoding to create a subtitle image. Here, rasterization is performed by generating a bitmap of the predetermined dot number (for instance, 26 dots high for Japanese kana or kanji) from an outline font in the outline font file 10 which corresponds to each character in the subtitle character string, the obtained bitmaps then being plotted on a bitmapped image. In the present embodiment, the rasterization unit 2 performs either monochrome or gray-scale rasterization according to the user specification made in advance.

It is desirable to determine whether monochrome or gray-scale rasterization is to be performed according to the type of language used for subtitles and the degree of character complexity. For example, for complex characters with many strokes, such as Japanese or Chinese kanji, it is preferable to perform gray-scale rasterization.

The subtitle image storage unit 3 stores the subtitle image and its size outputted from the rasterization unit 2.

The display attribute read unit 4 reads a display attribute from the display attribute file 11.

The display position calculation unit 5 calculates a display position (coordinates at which the top left point of the subtitle image is to be placed) of the subtitle image using the display attribute read by the display attribute read unit 4 and the subtitle image size stored in the subtitle image storage unit 3.

When the top alignment is specified in the display attribute as shown in FIG. 4A, the display position calculation unit 5 calculates the coordinates at which the top left point of the subtitle image is to be placed (hereinafter, the coordinates are expressed as (X_tl, Y_tl)), using the following formulas.

$$X\_tl=(DW-SW)/2$$

$$Y\_tl=Y\_1$$

Figure 5A:
FIGS. 5A and 5B each show a display screen on which a subtitle image is displayed according to the first horizontal attribute.
Figure 5B:
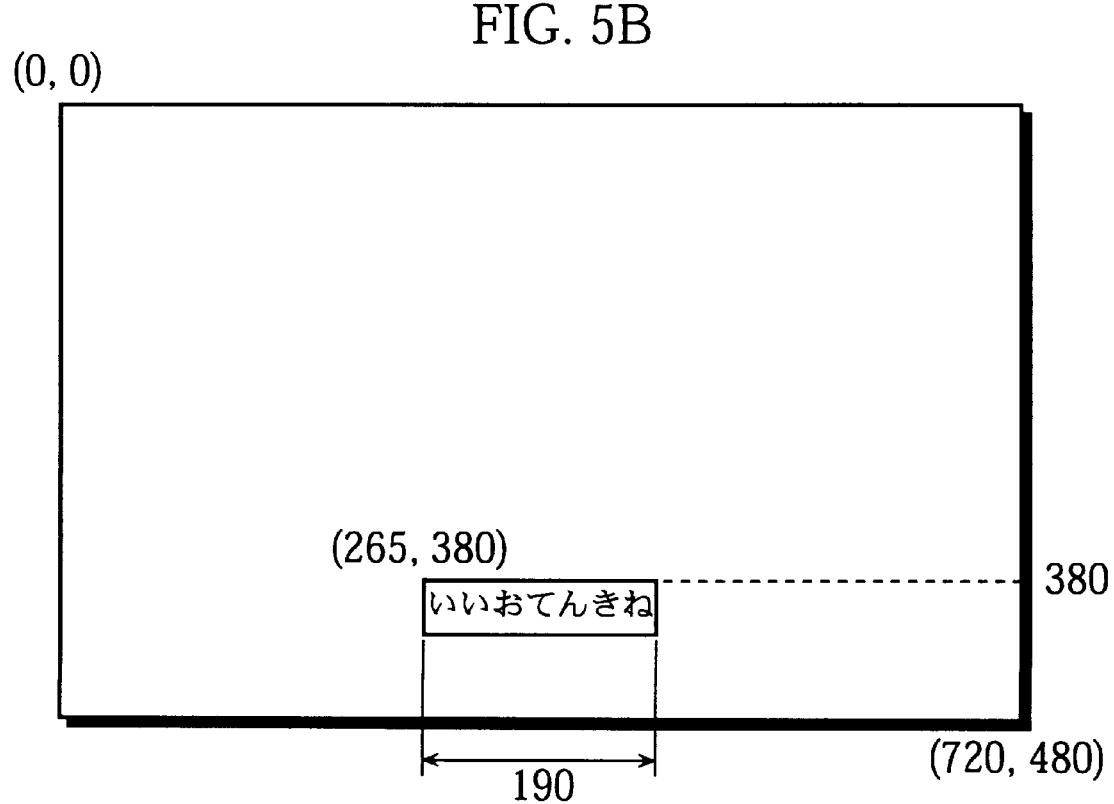

Here, "DW" represents the width of the display screen expressed in pixels, "SW" represents the width of the subtitle image expressed in pixels, and "Y_1" represents the Y coordinate (380 in FIG. 4A) that is set in the display attribute as the position at which the top end of the subtitle image is to be aligned. When the subtitle image of the subtitle number 1 is 50 pixels high by 240 pixels wide, and the subtitle image of the subtitle number 2 is 25 pixels high by 190 pixels wide, the coordinates (X_tl, Y_tl) are calculated as shown in FIGS. 5A and 5B, respectively.

On the other hand, when the bottom alignment is specified in the display attribute as shown in FIG. 4B, the display position calculation unit 5 calculates the coordinates (X_tl, Y_tl) using the following formulas.

$$X\_tl=(DW-SW)/2$$

$$Y\_tl=Y\_2-SH$$

Figure 6A:
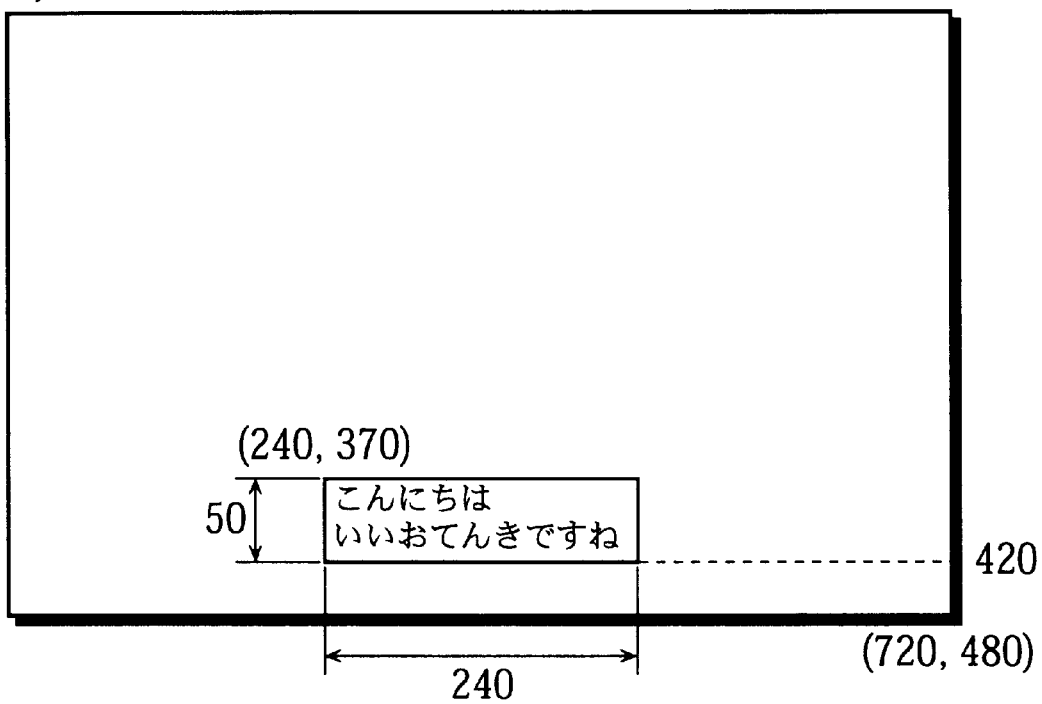
FIGS. 6A and 6B each show a display screen on which a subtitle image is displayed according to the second horizontal attribute.
Figure 6B:
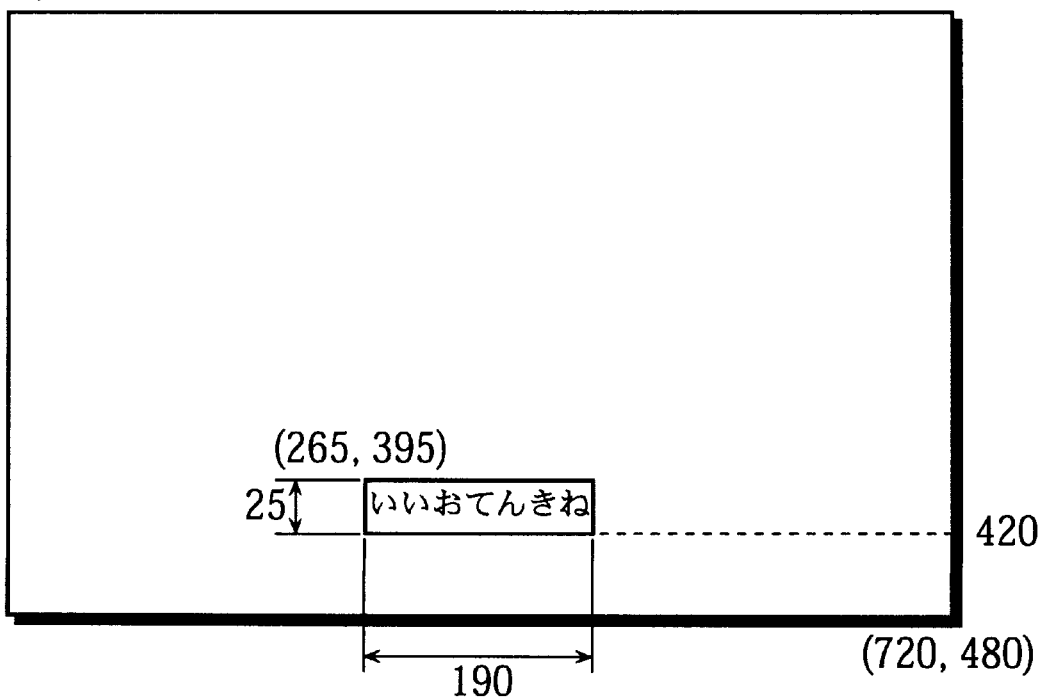

Here, "SH" represents the height of the subtitle image expressed in pixels, and "Y_2" represents the Y coordinate (420 in FIG. 4B) that is set in the display attribute as the position at which the bottom end of the subtitle image is to be aligned. When the subtitle image of the subtitle number 1 is 50 pixels high by 240 pixels wide, and the subtitle image of the subtitle number 2 is 25 pixels high by 190 pixels wide, the coordinates (X_tl, Y_tl) are calculated as shown in FIGS. 6A and 6B, respectively.

The sub-picture unit generation unit 6 refers to the time code file 9 and the subtitle image storage unit 3 to generate a sub-picture unit. More specifically, the sub-picture unit generation unit 6 reads a subtitle number, a subtitle display start time, and a subtitle display stop time from the time code file 9, reads a subtitle image corresponding to the read subtitle number from the subtitle image storage unit 3, and generates a sub-picture unit that includes the subtitle image, data showing a display position of the subtitle image, and the subtitle display start and stop time. Here, the data showing the display position is composed of the top left coordinates (X_tl, Y_tl) of the subtitle image which were calculated by the display position calculation unit 5 and the bottom right coordinates (X_br, Y_br) at which the bottom right point of the subtitle image is to be placed, the coordinates (X_br, Y_br) being calculated by the sub-picture unit generation unit 6 using the coordinates (X_tl, Y_tl) and the subtitle image size.

The sub-picture unit storage unit 7 stores each sub-picture unit generated by the sub-picture unit generation unit 6.

Data Structure of Sub-Picture Unit

Figure 7:
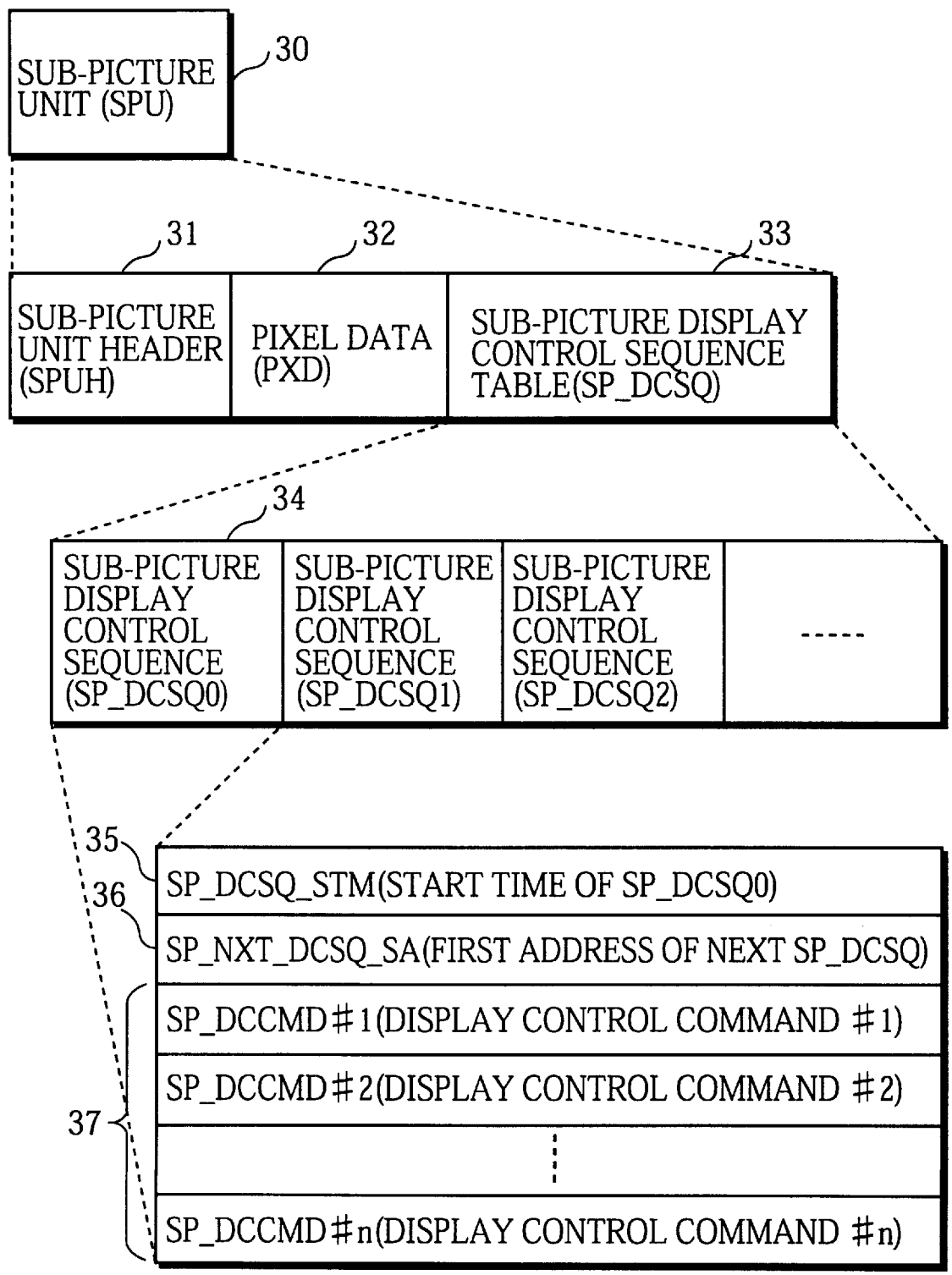
FIG. 7 shows the data structure of a sub-picture unit.

FIG. 7 shows the data structure of a sub-picture unit generated by the sub-picture unit generation unit 6. In the figure, a sub-picture unit (SPU) 30 is composed of a sub-picture unit header (SPUH) 31, pixel data (PXD) 32, and a sub-picture display control sequence table (SP_DCSQ) 33.

The sub-picture unit header (SPUH) 31 includes information on the size (the number of bytes) of the sub-picture unit (SPU) 30.

The pixel data (PXD) 32 includes a subtitle image read from the subtitle image storage unit 3.

The sub-picture display control sequence table (SP_DCSQ) 33 is made up of a plurality of sub-picture display control sequences (SP_DCSQ0, SP_DCSQ1, . . . ) for controlling the display start and stop of the sub-picture unit (SPU) 30 in a reproduction apparatus. When the sub-picture unit (SPU) 30 relates to a subtitle, the sub-picture display control sequence table (SP_DCSQ) 33 includes a display control sequence for controlling the subtitle display start and a display control sequence for controlling the subtitle display stop.

The sub-picture display control sequence (SP_DCSQ0) 34 is made up of SP_DCSQ_STM 35, SP_NXT_DCSQ_SA 36, and a plurality of display control commands (SP_DCCMD#1, SP_DCCMD#2, . . . ) 37.

SP_DCSQ_STM 35 shows an execution start time of the plurality of display control commands 37 included in the sub-picture display control sequence (SP_DCSQ0) 34.

SP_NXT_DCSQ_SA 36 shows the start address (the number of bytes from the start of the sub-picture unit (SPU) 30) of the next sub-picture display control sequence, when there is a sub-picture display control sequence following the sub-picture display control sequence (SP_DCSQ0) 34.

The plurality of display control commands (SP_DCCMD#1, SP_DCCMD#2, . . . ) 37 are display control commands which are to be executed in the reproduction apparatus at the above execution start time. There are various types of display control commands, such as a command for indicating the display start of the pixel data (PXD) 32 which is the subtitle image, a command for specifying the display position (top left coordinates and bottom right coordinates) of the pixel data (PXD) 32, and a command for indicating the display stop of the pixel data (PXD) 32.

Operation

The following is an explanation of the operation of the sub-picture unit generation apparatus 100 with the above construction.

The text read unit 1 reads each subtitle data set from the text file 8 shown in FIG. 2, starting from the first subtitle data set composed of the subtitle number 1 and the subtitle character string "こんにちは¥nいいおてんきですね" (HELLO, IT IS A FINE DAY). Here, "¥n" means a line break.

The rasterization unit 2 performs monochrome or gray-scale rasterization on the read subtitle character string using outline fonts to generate a subtitle image.

Figures 8A, 8B, 8C:
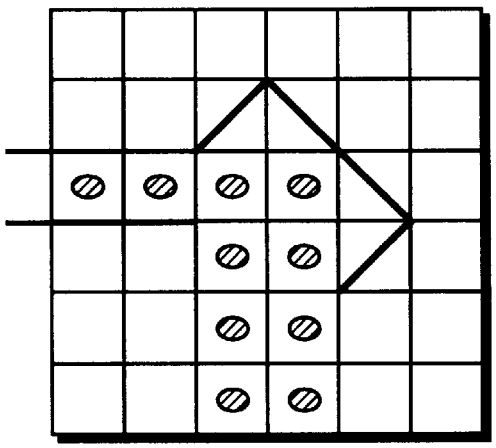
FIG. 8A is an illustration of rasterization.
FIG. 8B is an illustration of monochrome rasterization.
FIG. 8C is an illustration of gray-scale rasterization.

FIGS. 8A–8C show the process of rasterization. FIG. 8A shows a part of an enlarged outline font (example: top right part of Japanese kanji character "口". In the figure, "●" shows a grid which is inside the outline font. When the user indicates monochrome rasterization, the rasterization unit 2 rasterizes the character as shown in FIG. 8B. When the user indicates gray-scale rasterization, the rasterization unit 2 rasterizes the character as shown in FIG. 8C.

In FIG. 8B, each grid which is inside the outline font (grid with "●") is set at 1, and the other grids are set at 0.

In FIG. 8C, gray-scale rasterization is performed using five gray levels 0–4. Each grid is given a gray level based on an area encircled by the outline font. Accordingly, each grid which is inside the outline font is given gray level 4, each grid which is outside the outline font is given gray level 0, and each grid which is partly encircled by the outline font is given an intermediate gray level. For example, grids half encircled by the outline font, such as grids that are located at each edge of the character, are given gray level 2. On the display, these grids with gray level 2 are displayed half as bright as the grids with gray level 4. As a result, the shape of the character can be displayed more accurately than monochrome rasterization.

The subtitle image generated by the rasterization unit 2 is stored into the subtitle image storage unit 3 along with the subtitle image size.

The display position calculation unit 5 calculates the display position (X_tl, Y_tl) at which the top left of the subtitle image is to be placed, using a display attribute read by the display attribute read unit 4 and the subtitle image size stored in the subtitle image storage unit 3.

This calculation is explained below using the examples shown in FIGS. 5A and 5B. In FIG. 5A, the subtitle image of the subtitle number 1 is 240 pixels wide and is centered in the horizontal direction of the screen. The X coordinate of the top left point of the subtitle image is calculated as follows.

$$X\_tl=(720-240)/2=240 [\text{dots}]$$

In this example, the display position (Y coordinate) is set at 380 dots and the top alignment is specified in the display attribute file 11. Accordingly, (X_tl, Y_tl)=(240, 380) is obtained as the top left coordinates of the subtitle image.

In FIG. 5B, the subtitle image of the subtitle number 2 is 190 pixels wide and is centered in the horizontal direction of the screen. The X coordinate of the top left point of the subtitle image is calculated as follows.

$$X\_tl=(720-190)/2=265 [\text{dots}]$$

In this example, the display position (Y coordinate) is set at 380 dots and the top alignment is specified in the display attribute file 11. Accordingly, (X_tl, Y_tl)=(265, 380) is obtained as the top left coordinates of the subtitle image.

Examples of the calculation when the display position (Y coordinate) is set at 420 dots and the bottom alignment is specified in the display attribute file 11 are explained below with reference to FIGS. 6A and 6B.

In FIG. 6A, the subtitle image of the subtitle number 1 is 240 pixels wide and is centered in the horizontal direction of the screen. The X coordinate of the top left point of the subtitle image is calculated at 240 dots as in FIG. 5A. Since the bottom alignment is specified and the subtitle image is 50 pixels high as shown in the figure, the Y coordinate of the top left point of the subtitle image is calculated as follows.

$$Y\_tl=420-50=370[\text{dots}]$$

In FIG. 6B, on the other hand, the subtitle image of the subtitle number 2 is 190 pixels wide and is centered in the horizontal direction of the screen. The X coordinate of the top left point of the subtitle image is calculated at 265 dots as in FIG. 5B. Since the bottom alignment is specified and the subtitle image is 25 pixels high as shown in the figure, the Y coordinate of the top left point of the subtitle image is calculated as follows.

$$Y\_tl=420-25=395$$

Moving images for a movie are sometimes reproduced with black spaces at the top and bottom of the display screen. When a black space is relatively large, subtitles may be displayed in the black space. In such a case, it is preferable to specify the top alignment as the display attribute, as shown in FIGS. 5A and 5B.

On the other hand, when there are no black spaces when reproducing a movie, subtitles should be displayed on the lower part of moving images without seriously obstructing the moving images. In such a case, the bottom alignment is preferable, as in FIGS. 6A and 6B.

After the display position is calculated by the display position calculation unit 5, the sub-picture unit generation unit 6 generates a sub-picture unit.

FIG. 9 shows a specific example of a sub-picture unit which corresponds to FIG. 5A. The sub-picture unit generation unit 6 generates the sub-picture unit header (SPUH) 31, the pixel data (PXD) 32, and the sub-picture display control sequence table (SP_DCSQ) 33. Since the display of each subtitle for a movie is usually started at a given time and stopped after a few seconds, sub-picture display control sequences for the display start and the display stop are necessary. Accordingly, a sub-picture display control sequence (SP_DCSQ0) 44 and a sub-picture display control sequence (SP_DCSQ1) 45 are included in the sub-picture display control sequence table (SP_DCSQ) 33.

The sub-picture display control sequence (SP_DCSQ0) 44 includes SP_DCSQ_STM 46, SP_NXT_DCSQ_SA 47, SP_DCCMD#1 48, SP_DCCMD#2 49, SP_DCCMD#3 50, SP_DCCMD#4 51, SP_DCCMD#5 52, and SP_DCCMD#6 53.

SP_DCSQ_STM 46 is set at "00 00 00" as "(minute) (second) (frame number)" based on the subtitle display start time "00:00:00:00" in the time code file 9 shown in FIG. 3, and shows that the execution of the display control commands SP_DCCMD#1 48 to SP_DCCMD#6 53 is to be started at this set time.

SP_NXT_DCSQ_SA 47 shows "2076"[byte] as the start address of the next sub-picture display control sequence (SP_DCSQ1) 45.

In SP_DCCMD#1 48, "SET_COLOR 11 10 9 8" shows that four colors used in a highlight pixel 2, a highlight pixel 1, a pattern pixel, and a background pixel in the pixel data (PXD) 32 respectively correspond to color numbers 11, 10, 9, and 8 in a 16-color sub-picture display pallet included in management information in the system stream.

Note that the actual 16 colors are included in the system stream. When the sub-picture unit generation unit 6 generates a sub-picture unit using a subtitle image generated by the rasterization unit 2, the high-quality character display is possible by linearly changing the differences in brightness in the color information included in the system stream as follows.

| pixel type | brightness (0–255) |
|---|---|
| pattern pixel | 255 |
| highlight pixel 1 | 170 |
| highlight pixel 2 | 85 |
| background pixel | 0 |

In SP_DCCMD#2 49, "SET_CONTR 16 16 16 1" shows the mixed ratio of the subtitle image and a moving image reproduced from the video stream. The background pixel will be transparent on the display screen, since the moving image is outputted at the mixed ratio 100[%]. On the other hand, the pattern pixel, the highlight pixel 1, and the highlight pixel 2 will be superimposed on the moving image, since the sub-picture is outputted at the mixed ratio 100[%].

In SP_DCCMD#3 50, "SET_DAREA 240 479 380 429" shows the top left coordinates (X_tl, Y_tl) and the bottom right coordinates (X_br, Y_br) of the subtitle image display position shown in FIG. 5A. The four arguments 240, 479, 380, and 429 respectively correspond to X_tl, X_br, Y_tl, and Y_br.

In SP_DCCMD#4 51, "SET_DSPXA 000" shows that display data included in the pixel data (PXD) 32 starts from address 0, which is to say, the whole pixel data (PXD) 32 is used for the display.

In SP_DCCMD#5 52, "STA_DSP" is a command for indicating the display start of the pixel data (PXD) 32.

In SP_DCCMD#6 53, "CMD_END" shows the end of the sub-picture display control sequence (SP_DCSQ0) 44.

The sub-picture display control sequence (SP_DCSQ1) 45 includes SP_DCSQ_STM 54, SP_NXT_DCSQ_SA 55, SP_DCCMD#1 56, and SP_DCCMD#2 57.

SP_DCSQ_STM 54 is set at "00 05 00" as "(minute) (second) (frame number)" based on the subtitle display stop time "00:00:05:00" in the time code file 9 shown in FIG. 3, and shows that the execution of the display control commands SP_DCCMD#1 56 and SP_DCCMD#2 57 is to be started at this set time.

SP_NXT_DCSQ_SA 55 shows the start address (2076 byte) of the sub-picture display control sequence (SP_DCSQ1) 45 itself, since SP_DCSQ1 45 is the last sub-picture display control sequence in the present sub-picture unit.

In SP_DCCMD#1 56, "STP_DSP" indicates the display stop of the pixel data (PXD) 32.

In SP_DCCMD#2 57, "CMD_END" shows the end of the sub-picture display control sequence (SP_DCSQ1) 45.

Thus, a sub-picture unit is generated for each subtitle by the sub-picture unit generation unit 6 and stored into the sub-picture unit storage unit 7. The sub-picture units stored in the sub-picture unit storage unit 7 are sequentially combined with each other to form a sub-picture stream.

With the sub-picture unit generation apparatus of the present embodiment, a display position (top left coordinates) of each subtitle image is calculated according to a display attribute in the display attribute file 11 that shows a base position used when arranging each subtitle image. Accordingly, the user does not have to calculate the top left coordinates of each subtitle image which differs in size, so that the time for generating sub-picture units for subtitles can be greatly reduced.

Second Embodiment

Construction

Figure 10:
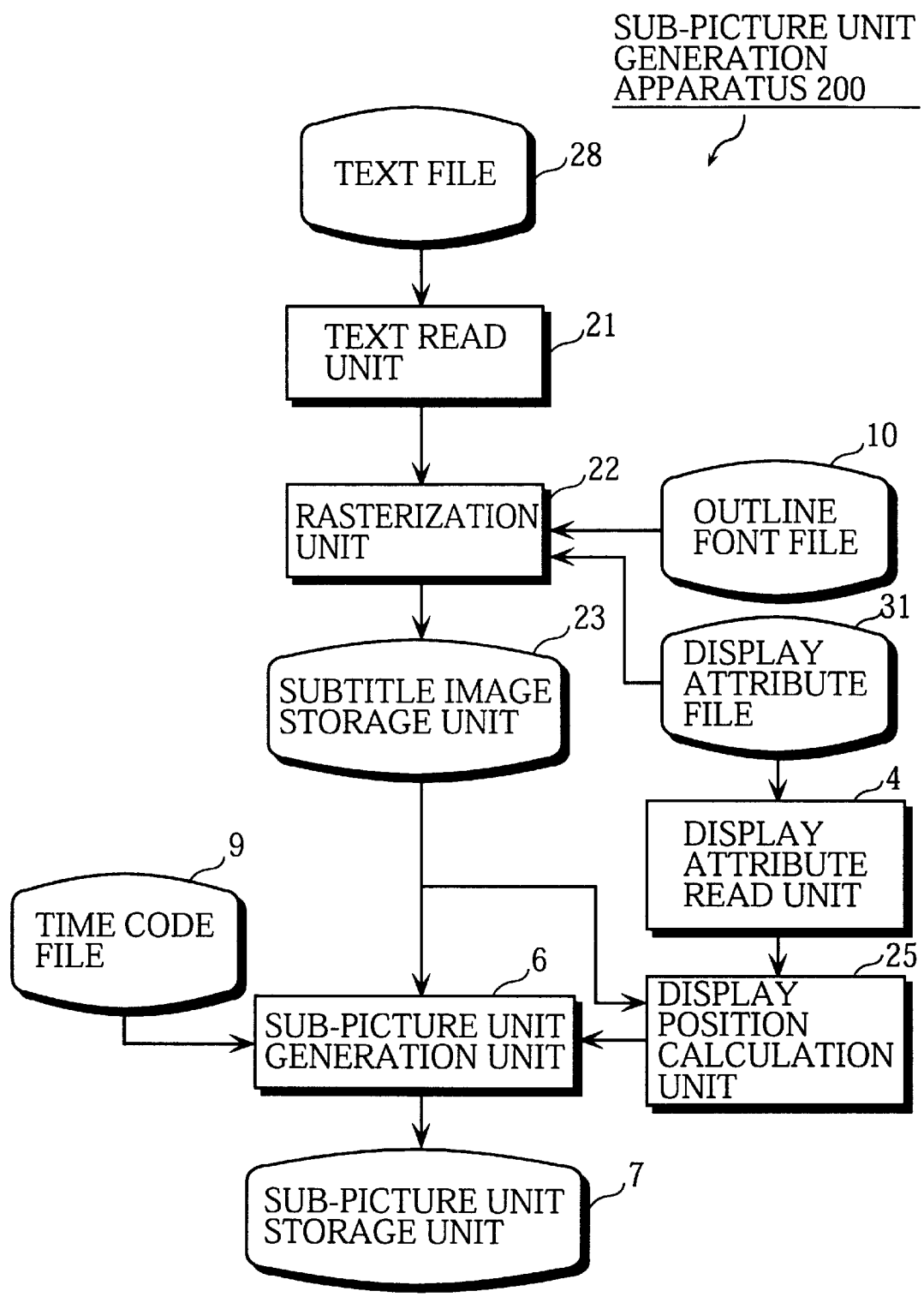
FIG. 10 is a function block diagram showing the sub-picture unit generation apparatus of the second embodiment of the present invention.

FIG. 10 is a function block diagram showing the sub-picture unit generation apparatus of the second embodiment of the present invention.

A component which has the same function as the first embodiment shown in FIG. 1 is given the same number. The following explanation focuses on differences with the first embodiment.

The sub-picture unit generation apparatus 200 of the second embodiment includes a display attribute file 31, a text file 28, a text read unit 21, a rasterization unit 22, a subtitle image storage unit 23, and a display position calculation unit 25, instead of the display attribute file 11, the text file 8, the text read unit 1, the rasterization unit 2, the subtitle image storage unit 3, and the display position calculation unit 5 shown in FIG. 1. The sub-picture unit generation apparatus 200 is constructed such that the user indicates a given display attribute, among a plurality of display attributes, for each subtitle.

First, the display attribute file 31 and the text file 28 are explained.

The display attribute file 31 is different from the display attribute file 11 of the first embodiment in that it includes a plurality of display attributes. FIG. 12 shows an example of the display attribute file 31 that includes four display attributes composed of a first horizontal attribute, a second horizontal attribute, a first vertical attribute, and a second vertical attribute. Among these attributes, the first and second horizontal attributes are the same as those shown in FIGS. 4A and 4B, respectively.

Figure 13A:
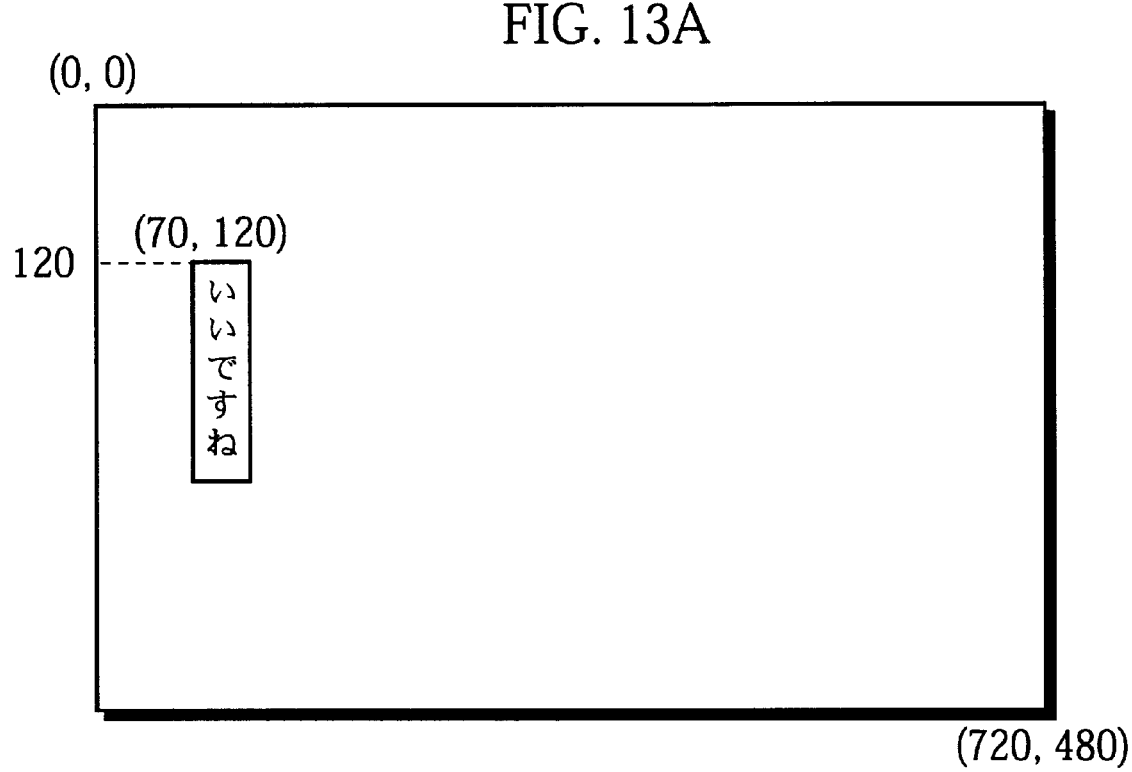
FIG. 13A shows a display screen on which a subtitle image is displayed according to the first vertical attribute.

The first vertical attribute specifies a base position with "vertical subtitle display position (Y coordinate)" and "vertical left subtitle display position (X coordinate)". As shown in FIG. 13A, "vertical subtitle display position (Y coordinate)" shows the Y coordinate at which the top end of a vertically-written subtitle image is to be aligned, while "vertical left subtitle display position (X coordinate)" shows the X coordinate at which the left end of the vertically-written subtitle image is to be aligned.

Figure 13B:
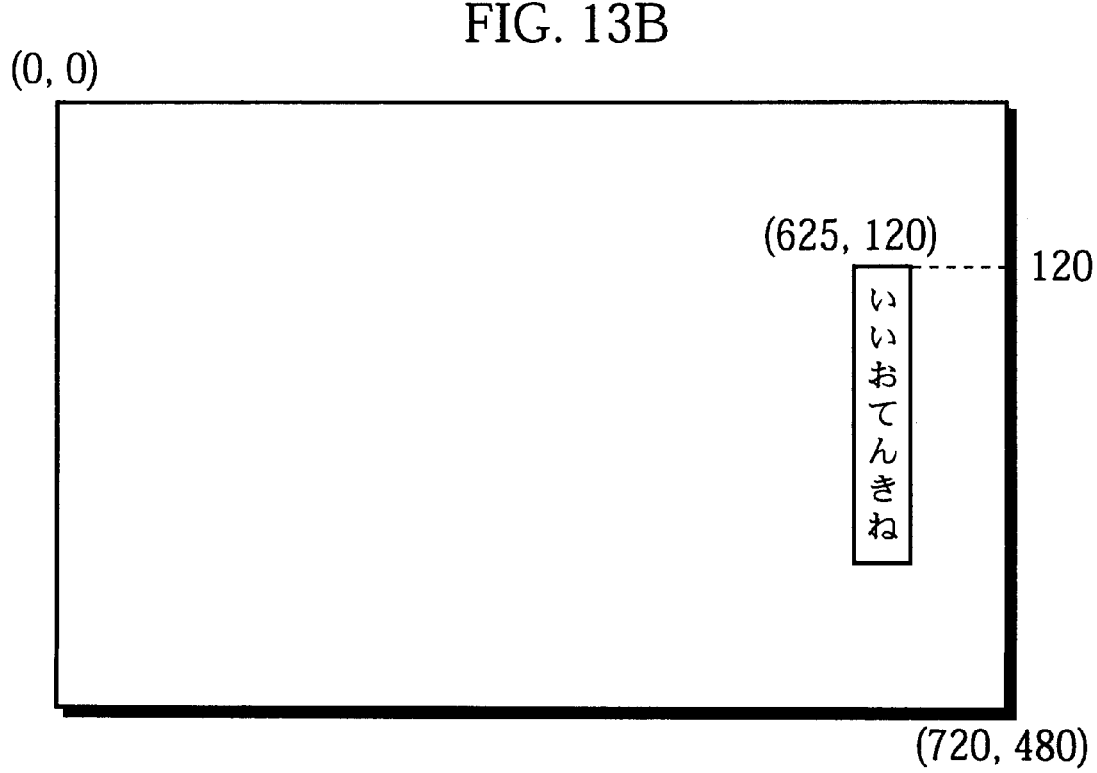
FIG. 13B shows a display screen on which a subtitle image is displayed according to the second vertical attribute.

The second vertical attribute specifies a base position with "vertical subtitle display position (Y coordinate)" and "vertical right subtitle display position (X coordinate)". As shown in FIG. 13B, "vertical subtitle display position (Y coordinate)" shows the Y coordinate at which the top end of a vertically-written subtitle image is to be aligned, while "vertical right subtitle display position (X coordinate)" shows the X coordinate at which the right end of the vertically-written subtitle image is to be aligned.

The text file 28 stores a plurality of subtitle character strings which are each associated with a subtitle number and an indication of a display attribute. Here, the display attribute is one of the first horizontal attribute, the second horizontal attribute, the first vertical attribute, and the second vertical attribute in the display attribute file 31, and is arbitrarily indicated by the user. FIG. 11 shows an example of the text file 28. In the figure, the first horizontal attribute is indicated for the subtitle character string of the subtitle number 1, while the second vertical attribute is indicated for the subtitle character string of the subtitle number 2.

Next, the components shown in FIG. 10 that differ with the first embodiment are explained.

The text read unit 21 reads each subtitle number, subtitle character string, and display attribute indication from the text file 28.

The rasterization unit 22 generates either a horizontal subtitle image or a vertical subtitle image, depending on the display attribute indication read by the text read unit 21. Here, the horizontal subtitle image means a subtitle image in which a character string is horizontally arranged, while the vertical subtitle image means a subtitle image in which a character string is vertically arranged. When the first or second horizontal attribute is indicated, the rasterization unit 22 rasterizes a subtitle character string to generate a horizontal subtitle image. On the other hand, when the first or second vertical attribute is indicated, the rasterization unit 22 rasterizes a subtitle character string to generate a vertical subtitle image. Aside from arranging a subtitle character string in one of horizontal and vertical directions, the rasterization unit 22 operates in the same way as the rasterization unit 2 of the first embodiment.

The subtitle image storage unit 23 stores the subtitle image outputted from the rasterization unit 22 along with the subtitle image size and the display attribute indication.

The display position calculation unit 25 reads the subtitle image size and the display attribute indication from the subtitle image storage unit 23, and calculates a display position (coordinates at which the top left point of the subtitle image is to be placed) of the subtitle image according to a display attribute, among the plurality of display attributes read from the display attribute file 31 by the display attribute read unit 4, which is indicated for the subtitle image.

When the first or second horizontal attribute is indicated, the display position calculation unit 25 operates in the same way as the display position calculation unit 5 of the first embodiment.

When the first vertical attribute is indicated, the display position calculation unit 25 calculates the coordinates ($X\_tl$, $Y\_tl$) using the following formulas.

$$X\_tl = X\_3$$

Y_tl=Y_3

Here, "X_3" represents the X coordinate at which the left end of the subtitle image is to be aligned, and "Y_3" represents the Y coordinate at which the top end of the subtitle image is to be aligned, the X and Y coordinates being shown in the first vertical attribute.

When the second vertical attribute is indicated, the display position calculation unit 25 calculates the coordinates (X_tl, Y_tl) using the following formulas.

$$X\_tl = X\_4 - SW$$

$$Y\_tl = Y\_4$$

Here, "X_4" represents the X coordinate at which the right end of the subtitle image is to be aligned, "Y_4" represents the Y coordinate at which the top end of the subtitle image is to be aligned, and "SW" represents the width of the subtitle image expressed in pixels.

Operation

The following is an explanation of the operation of the sub-picture unit generation apparatus 200 with the above construction.

The text read unit 21 reads each subtitle data set from the text file 28 shown in FIG. 11. Here, the first subtitle data set is made up of the subtitle number 1, the first horizontal attribute as the indicated display attribute, and the subtitle character string "こんにちは¥nいいおてんきですね" (HELLO, IT IS A FINE DAY) ("¥n": line break). The second subtitle data set is made up of the subtitle number 2, the second vertical attribute as the indicated display attribute, and the subtitle character string "いいおてんきね" (IT IS A FINE DAY). The third subtitle data set is made up of the subtitle number 3, the first horizontal attribute as the indicated display attribute, and the subtitle character string 山へ行かない (LET'S GO TO THE MOUNTAINS). The fourth subtitle data set is made up of the subtitle number 4, the first vertical attribute as the indicated display attribute, and the subtitle character string "いいですね" (FINE).

A subtitle character string read by the text read unit 21 is rasterized by the rasterization unit 22, and as a result a horizontal subtitle image or a vertical subtitle image is generated according to the display attribute indication and stored into the subtitle image storage unit 23.

Next, the display position calculation unit 25 calculates a display position of the subtitle image stored in the subtitle image storage unit 23, based on the indicated display attribute.

When the first or second horizontal attribute is indicated, the display position is calculated in the same way as the first embodiment.

The following is a specific explanation of the display position calculation when the first or second vertical attribute is indicated, with reference to FIGS. 13A and 13B.

FIG. 13A relates to the subtitle character string of the subtitle number 4 in FIG. 11. Since the first vertical attribute is indicated for this subtitle character string, the rasterization unit 22 generates a vertical subtitle image by rasterizing the vertically-arranged subtitle character string "いいですね".

The display position calculation unit 25 refers to the first vertical attribute read from the display attribute file 31 by the display attribute read unit 4. As shown in FIG. 12, the vertical subtitle display position (Y coordinate) and the vertical left subtitle display position (X coordinate) are respectively set at "120" and "70" in the first vertical attribute. Accordingly, the display position calculation unit 25 obtains (X_tl, Y_tl)=(70, 120) as the coordinates at which the top left point of the subtitle image is to be placed.

FIG. 13B relates to the subtitle character string of the subtitle number 2 in FIG. 11. Since the second vertical attribute is indicated for this subtitle character string, the rasterization unit 22 generates a vertical subtitle image by rasterizing the vertically-arranged subtitle character string "いいおてんきね".

The display position calculation unit 25 refers to the second vertical attribute read from the display attribute file 31 by the display attribute read unit 4. As shown in FIG. 12, the vertical subtitle display position (Y coordinate) and the vertical right subtitle display position (X coordinate) are respectively set at "120" and "650" in the second vertical attribute. The vertical subtitle display position (Y coordinate) is used as the Y_tl coordinate.

The vertical right subtitle display position (X coordinate) corresponds to the X coordinate of the right end of the subtitle image. When the subtitle image is 25 pixels wide, the X_tl coordinate of the subtitle image is calculated as follows.

$$X\_tl = 650 - 25 = 625$$

As a result, the coordinates at which the top left point of the subtitle image is to be placed become (X_tl, Y_tl)= (625, 120).

It should be noted that the first vertical attribute and the second vertical attribute respectively specify the X coordinate of the left end of a subtitle image and the X coordinate of the right end of a subtitle image in consideration of a safe frame on the display screen. A TV used as a DVD display has a margin of approximately 10% at each end of a screen, and images are not displayed in these margins. A display area aside from such margins is called the safe frame. If the X coordinate of the left end of a subtitle image is specified in the second vertical attribute, the subtitle image may not be contained within the safe frame and a part of the subtitle may not be displayed, especially when the subtitle is made up of a plurality of lines. In order to prevent a vertical subtitle image displayed on the right side of the display screen from extending off the safe frame, "vertical right subtitle display position (X coordinate)" is used in the second vertical attribute.

While the display attribute read unit 4 reads the display attribute file in the above embodiments, the user may instead indicate the display attribute(s) via an input unit, such as a keyboard or a mouse.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A sub-picture unit generation apparatus for generating a plurality of sub-picture units that compose a sub-picture stream which is interleaved with a video stream into a system stream, each sub-picture unit including a subtitle image that is to be superimposed on moving images reproduced from the video stream, the sub-picture unit generation apparatus comprising:

attribute storage means for storing a display attribute that shows a base position for arranging each subtitle image;

character string storage means for storing a plurality of subtitle character strings;

subtitle image generation means for generating a subtitle image from one of the plurality of subtitle character strings a stored in the character string storage means;

display position determination means for determining a display position of the subtitle image according to the display attribute; and sub-picture unit generation means for generating a sub-picture unit that includes the subtitle image and display position data showing the determined display position.

2. The sub-picture unit generation apparatus of claim 1, wherein the subtitle image generated by the subtitle image generation means is rectangular, and wherein the display attribute shows a position at which one of a top end, a bottom end, a left end, and a right end of each subtitle image is to be aligned.

3. The sub-picture unit generation apparatus of claim 2, wherein the subtitle image generation means generates the rectangular subtitle image in which one of the plurality of subtitle character strings is horizontally written, wherein the attribute storage means stores one of a first horizontal attribute and a second horizontal attribute as the display attribute, the first horizontal attribute showing a position at which the top end of each subtitle image is to be aligned and indicating centering of each subtitle image, the second horizontal attribute showing a position at which the bottom end of each subtitle image is to be aligned and indicating centering of each subtitle image, and wherein the display position determination means calculates coordinates $(X\_tl, Y\_tl)$ at which a top left point of the subtitle image is to be placed, according to the display attribute, a height and a width of the subtitle image expressed in pixels, and a height and a width of a display screen expressed in pixels.

4. The sub-picture unit generation apparatus of claim 3, wherein the display position determination means uses a formula set to calculate the coordinates $(X\_tl, Y\_tl)$ at which the top left point of the subtitle image is to be placed, when the display attribute is the first horizontal attribute, the formula set being $$X\_tl=(DW-SW)/2$$

$$Y\_tl=Y\_1,$$

wherein DW represents the width of the display screen expressed in pixels, SW represents the width of the subtitle image expressed in pixels, and $Y\_1$ represents a Y coordinate that is shown by the first horizontal attribute as the position at which the top end of each subtitle image is to be aligned.

5. The sub-picture unit generation apparatus of claim 3, wherein the display position determination means uses a formula set to calculate the coordinates $(X\_tl, Y\_tl)$ at which the top left point of the subtitle image is to be placed, when the display attribute is the second horizontal attribute, the formula set being $$X\_tl=(DW-SW)/2$$

$$Y\_tl=Y\_2-SH,$$

wherein DW represents the width of the display screen expressed in pixels, SW represents the width of the subtitle image expressed in pixels, SH represents the height of the subtitle image expressed in pixels, and $Y\_2$ represents a Y coordinate that is shown by the second horizontal attribute as the position at which the bottom end of each subtitle image is to be aligned.

6. The sub-picture unit generation apparatus of claim 3, wherein the subtitle image generation means includes:

an outline font storage unit for storing outline fonts;

a read unit for reading one of the plurality of subtitle character strings from the character string storage means; and a rasterization unit for performing gray-scale rasterization based on outline fonts corresponding to the read subtitle character string to generate the subtitle image.

7. The sub-picture unit generation apparatus of claim 2, wherein the subtitle image generation means generates the rectangular subtitle image in which one of the plurality of subtitle character strings is vertically written, wherein the attribute storage means stores one of a first vertical attribute and a second vertical attribute as the display attribute, the first vertical attribute showing a position at which the top end of each subtitle image is to be aligned and a position at which the left end of each subtitle image is to be aligned, the second vertical attribute showing a position at which the top end of each subtitle image is to be aligned and a position at which the right end of each subtitle image is to be aligned, and wherein the display position determination means calculates coordinates $(X\_tl, Y\_tl)$ at which a top left point of the subtitle image is to be placed, according to the display attribute, a height and a width of the subtitle image expressed in pixels, and a height and a width of a display screen expressed in pixels.

8. The sub-picture unit generation apparatus of claim 7, wherein the display position determination means uses a formula set to calculate the coordinates $(X\_tl, Y\_tl)$ at which the top left point of the subtitle image is to be placed, when the display attribute is the first vertical attribute, the formula set being $$X\_tl=X\_3$$

$$Y\_tl=Y\_3,$$

wherein $X\_3$ represents an X coordinate that is shown by the first vertical attribute as the position at which the left end of each subtitle image is to be aligned, and $Y\_3$ represents a Y coordinate that is shown by the first vertical attribute as the position at which the top end of each subtitle image is to be aligned.

9. The sub-picture unit generation apparatus of claim 7, wherein the display position determination means uses a formula set to calculate the coordinates $(X\_tl, Y\_tl)$ at which the top left point of the subtitle image is to be placed, when the display attribute is the second vertical attribute, the formula set being $$X\_tl=X\_4-SW$$

$$Y\_tl=Y\_4,$$

wherein X_4 represents an X coordinate that is shown by the second vertical attribute as the position at which the right end of each subtitle image is to be aligned, Y_4 represents a Y coordinate that is shown by the second vertical attribute as the position at which the top end of each subtitle image is to be aligned, and SW represents the width of the subtitle image expressed in pixels.

10. The sub-picture unit generation apparatus of claim 7, wherein the subtitle image generation means includes:
- an outline font storage unit for storing outline fonts;
- a read unit for reading one of the plurality of subtitle character strings from the character string storage means; and
- a rasterization unit for performing gray-scale rasterization based on outline fonts corresponding to the read subtitle character string to generate the subtitle image.

11. A sub-picture unit generation apparatus for generating a plurality of sub-picture units that compose a sub-picture stream which is interleaved with a video stream into a system stream, each sub-picture unit including a subtitle image that is to be superimposed on moving images reproduced from the video stream, the sub-picture unit generation apparatus comprising:
- attribute storage means for storing at least two out of a first horizontal attribute, a second horizontal attribute, a first vertical attribute, and a second vertical attribute that each show a base position for arranging a subtitle image,
- the first horizontal attribute showing a position at which a top end of a subtitle image is to be aligned and indicating centering of the subtitle image,
- the second horizontal attribute showing a position at which a bottom end of a subtitle image is to be aligned and indicating centering of the subtitle image,
- the first vertical attribute showing a position at which a left end of a subtitle image is to be aligned and a position at which a top end of the subtitle image is to be aligned, and
- the second vertical attribute showing a position at which a right end of a subtitle image is to be aligned and a position at which a top end of the subtitle image is to be aligned;
- text storage means for storing a text that includes a plurality of subtitle character strings which are each accompanied with a display attribute indication;
- subtitle image generation means for generating a subtitle image from one of the plurality of subtitle character strings stored in the text storage means;
- display position determination means for determining a display position of the subtitle image according to a display attribute corresponding to a display attribute indication for the subtitle character string; and
- sub-picture unit generation means for generating a sub-picture unit that includes the subtitle image and display position data showing the determined display position.

12. The sub-picture unit generation apparatus of claim 11, wherein when one of the first horizontal attribute and the second horizontal attribute is indicated for the subtitle character string, the subtitle image generation means generates the subtitle image in which the subtitle character string is horizontally written, and when one of the first vertical attribute and the second vertical attribute is indicated for the subtitle character string, the subtitle image generation means generates the subtitle image in which the subtitle character string is vertically written.

13. The sub-picture unit generation apparatus of claim 12, wherein when the first horizontal attribute is indicated, the display position determination means uses a first formula set to calculate coordinates $(X\_tl, Y\_tl)$ at which a top left point of the subtitle image is to be placed, the first formula set being $$X\_tl=(DW-SW)/2$$

$$Y\_tl=Y\_1,$$

DW representing a width of a display screen expressed in pixels, SW representing a width of the subtitle image expressed in pixels, and Y_1 representing a Y coordinate that is shown by the first horizontal attribute as the position at which the top end of the subtitle image is to be aligned, wherein when the second horizontal attribute is indicated, the display position determination means uses a second formula set to calculate the coordinates $(X\_tl, Y\_tl)$, the second formula set being $$X\_tl=(DW-SW)/2$$

$$Y\_tl=Y\_2-SH,$$

SH representing a height of the subtitle image expressed in pixels, and Y_2 representing a Y coordinate that is shown by the second horizontal attribute as the position at which the bottom end of the subtitle image is to be aligned, wherein when the first vertical attribute is indicated, the display position determination means uses a third formula set to calculate the coordinates $(X\_tl, Y\_tl)$, the third formula set being $$X\_tl=X\_3$$

$$Y\_tl=Y\_3,$$

X_3 representing an X coordinate that is shown by the first vertical attribute as the position at which the left end of the subtitle image is to be aligned, and Y_3 representing a Y coordinate that is shown by the first vertical attribute as the position at which the top end of the subtitle image is to be aligned, and wherein when the second vertical attribute is indicated, the display position determination means uses a fourth formula set to calculate the coordinates $(X\_tl, Y\_tl)$, the fourth formula set being $$X\_tl=X\_4-SW$$

$$Y\_tl=Y\_4,$$

X_4 representing an X coordinate that is shown by the second vertical attribute as the position at which the right end of the subtitle image is to be aligned, and Y_4 representing a Y coordinate that is shown by the second vertical attribute as the position at which the top end of the subtitle image is to be aligned.

14. The sub-picture unit generation apparatus of claim 12, wherein the subtitle image generation means includes:
- an outline font storage unit for storing outline fonts;
- a read unit for reading one of the plurality of subtitle character strings and the display attribute indication accompanied with the subtitle character string from the text storage means;

a judgement unit for judging whether one of the first horizontal attribute and the second horizontal attribute is indicated for the subtitle character string in order to determine that the subtitle character string is to be horizontally written, and for judging whether one of the first vertical attribute and the second vertical attribute is indicated for the subtitle character string in order to determine that the subtitle character string is to be vertically written; and a rasterization unit for generating the subtitle image by performing gray-scale rasterization based on outline fonts corresponding to the subtitle character string that is written in accordance with a judgement result by the judgement unit.

15. A computer-readable storage medium storing a sub-picture unit generation program for generating a plurality of sub-picture units that compose a sub-picture stream which is interleaved with a video stream into a system stream, each sub-picture unit including a subtitle image that is to be superimposed on moving images reproduced from the video stream, the sub-picture unit generation program comprising:

a subtitle image generation step for reading each of a plurality of subtitle character strings from a character string file and generating a subtitle image from a read subtitle character string;

a display position determination step for reading a display attribute showing a base position for arranging each subtitle image from an attribute file, and for determining a display position of the generated subtitle image according to the read display attribute; and a sub-picture unit generation step for generating a sub-picture unit that includes the subtitle image and display position data showing the determined display position.

16. The computer-readable storage medium of claim 15, wherein the subtitle image generated by the subtitle image generation step is rectangular, and wherein the display attribute shows a position at which one of a top end, a bottom end, a left end, and a right end of each subtitle image is to be aligned.

17. The computer-readable storage medium of claim 16, wherein the subtitle image generation step generates the rectangular subtitle image in which the subtitle character string is horizontally written, wherein the display attribute is one of a first horizontal attribute and a second horizontal attribute, the first horizontal attribute showing a position at which the top end of each subtitle image is to be aligned and indicating centering of each subtitle image, the second horizontal attribute showing a position at which the bottom end of each subtitle image is to be aligned and indicating centering of each subtitle image, and wherein the display position determination step calculates coordinates at which a top left point of the subtitle image is to be placed, according to the display attribute, a height and a width of the subtitle image expressed in pixels, and a height and a width of a display screen expressed in pixels.

18. The computer-readable storage medium of claim 16, wherein the subtitle image generation step generates the rectangular subtitle image in which the subtitle character string is vertically written, wherein the display attribute is one of a first vertical attribute and a second vertical attribute, the first vertical attribute showing a position at which the top end of each subtitle image is to be aligned and a position at which the left end of each subtitle image is to be aligned, the second vertical attribute showing a position at which the top end of each subtitle image is to be aligned and a position at which the right end of each subtitle image is to be aligned, and wherein the display position determination step calculates coordinates at which a top left point of the subtitle image is to be placed, according to the display attribute, a height and a width of the subtitle image expressed in pixels, and a height and a width of a display screen expressed in pixels.

19. A computer-readable storage medium storing a sub-picture unit generation program for generating a plurality of sub-picture units that compose a sub-picture stream which is interleaved with a video stream into a system stream, each sub-picture unit including a subtitle image that is to be superimposed on moving images reproduced from the video stream, the sub-picture unit generation program comprising:

a subtitle image generation step for reading each of a plurality of subtitle character strings which are each accompanied with a display attribute indication from a character string file and for generating a subtitle image from a read subtitle character string;

a display position determination step for reading a display attribute indicated for the subtitle character string from an attribute file and determining a display position of the generated subtitle image according to the read display attribute, wherein the attribute file stores at least two out of a first horizontal attribute, a second horizontal attribute, a first vertical attribute, and a second vertical attribute that each show a base position for arranging a subtitle image, the first horizontal attribute showing a position at which a top end of a subtitle image is to be aligned and indicating centering of the subtitle image, the second horizontal attribute showing a position at which a bottom end of a subtitle image is to be aligned and indicating centering of the subtitle image, the first vertical attribute showing a position at which a left end of a subtitle image is to be aligned and a position at which a top end of the subtitle image is to be aligned, and the second vertical attribute showing a position at which a right end of a subtitle image is to be aligned and a position at which a top end of the subtitle image is to be aligned; and a sub-picture unit generation step for generating a sub-picture unit that includes the generated subtitle image and display position data showing the determined display position.

20. The computer-readable storage medium of claim 19, wherein when one of the first horizontal attribute and the second horizontal attribute is indicated for the subtitle character string, the subtitle image generation step generates the subtitle image in which the subtitle character string is horizontally written, and when one of the first vertical attribute and the second vertical attribute is indicated for the subtitle character string, the subtitle image generation step generates the subtitle image in which the subtitle character string is vertically written.

* * * * *